US012104851B2

(12) United States Patent
García Montero et al.

(10) Patent No.: US 12,104,851 B2
(45) Date of Patent: Oct. 1, 2024

(54) DEVICE AND METHOD FOR SIMULTANEOUS LYOPHILISATION OF A PLURALITY OF BIOLOGICAL SAMPLES

(71) Applicant: UNIVERSIDAD DE SALAMANCA, Salamanca (ES)

(72) Inventors: Andrés Celestino García Montero, Salamanca (ES); Alberto Orfao De Matos Correia E Vale, Salamanca (ES); Francisco Javier García Palomo, Salamanca (ES); Catia Daniela Quintas Faria, Salamanca (ES); Roberto José García Martín, Salamanca (ES); Maria Pérez Caro, Salamanca (ES)

(73) Assignee: UNIVERSIDAD DE SALAMANCA, Salamanca (ES)

( * ) Notice: Subject to any disclaimer, the term of this patent is extended or adjusted under 35 U.S.C. 154(b) by 353 days.

(21) Appl. No.: 17/624,694

(22) PCT Filed: Jul. 2, 2020

(86) PCT No.: PCT/ES2020/070428
§ 371 (c)(1),
(2) Date: Jan. 4, 2022

(87) PCT Pub. No.: WO2021/001589
PCT Pub. Date: Jan. 7, 2021

(65) Prior Publication Data

US 2022/0252346 A1 Aug. 11, 2022

(30) Foreign Application Priority Data

Jul. 4, 2019 (ES) .................................. 201930619

(51) Int. Cl.
*F26B 5/06* (2006.01)
*F26B 25/00* (2006.01)

(52) U.S. Cl.
CPC .............. *F26B 5/06* (2013.01); *F26B 25/003* (2013.01)

(58) Field of Classification Search
CPC ................................ F26B 5/06; F26B 24/003
(Continued)

(56) References Cited

U.S. PATENT DOCUMENTS 3,290,788 A * 12/1966 Seelandt ................. F26B 5/065 34/294
4,597,188 A * 7/1986 Trappler ................... F26B 5/06 34/92
(Continued)

FOREIGN PATENT DOCUMENTS

EP 2745064 A2 6/2014
ES 2802149 A1 * 1/2021 ............ F26B 25/003
(Continued)

OTHER PUBLICATIONS

Sajal Manubhai Patel, "Emerging Freeze-Drying Process Development and Scale-up Issues", Article, 2011, 372-378, vol. 12, No. 1, AAPS PharmSciTech.
(Continued)

*Primary Examiner* — Stephen M Gravini
(74) *Attorney, Agent, or Firm* — Hayes Soloway PC

(57) ABSTRACT

The invention relates to a device and method for the simultaneous lyophilisation of a plurality of biological samples ensuring the traceability of said samples intended to be housed within coded containers (1); the device comprises a diffuser block (2) comprising a plurality of openings which define receptacles (21) to house the coded containers (1), wherein the diffuser block (2) further comprises a perimeter
(Continued)

cavity (24) configured so that the alloy surrounding each receptacle (21) is similar in all the coded containers (1), enabling high thermal homogeneity, and the receptacles (21) have through openings defining an open bottom (23) to scan the coded containers (1). Likewise, the device further comprises a transfer lid (3) to ensure the position of each container (1) when it is transferred to the diffuser block (1) and back to the starting box (4).

16 Claims, 6 Drawing Sheets

(58) Field of Classification Search
USPC ........................................................ 34/92, 287
See application file for complete search history.

(56) References Cited

U.S. PATENT DOCUMENTS 5,522,155 A * 6/1996 Jones ........................ A61J 1/065 34/286
5,937,536 A * 8/1999 Kieselbach ............. F26B 5/044 34/92
6,233,844 B1 * 5/2001 Gallego Juarez ......... A23L 3/54 34/256
6,517,526 B1 2/2003 Tamari
6,968,631 B1 * 11/2005 Kuhn ........................ F26B 5/06 34/406
8,689,460 B2 * 4/2014 Kuu .......................... F26B 5/06 165/185
8,904,664 B2 * 12/2014 Pringle ............... A61L 26/0057 623/23.72
11,781,811 B2 * 10/2023 Knight ...................... F26B 5/06 34/284
2008/0175757 A1 7/2008 Powell et al.
2014/0083212 A1 3/2014 Schryver et al.
2014/0290090 A1 * 10/2014 Campion .......... H01L 21/02052 34/381
2015/0122693 A1 5/2015 Duetschle et al.
2018/0168203 A1 * 6/2018 Wicherski ................. F26B 3/04
2019/0041132 A1 2/2019 McCann et al.
2022/0214107 A1 * 7/2022 Newman ................. F26B 15/18
2022/0252346 A1 * 8/2022 García Montero ....... F26B 5/06

FOREIGN PATENT DOCUMENTS

WO 03006904 A1 1/2003
WO 2013164422 A2 11/2013
WO 2017137637 A2 8/2017
WO WO-2021001589 A1 * 1/2021 ............ F26B 25/003

OTHER PUBLICATIONS

Anonymous, “Well Freeze-Drying System”, Product Listing, 2008, 954-955, vol. 320, Science.

* cited by examiner

DEVICE AND METHOD FOR SIMULTANEOUS LYOPHILISATION OF A PLURALITY OF BIOLOGICAL SAMPLES

CROSS-REFERENCE TO RELATED APPLICATIONS AND PRIORITY

This patent application claims priority from PCT Application No. PCT/ES2020/070428 filed Jul. 2, 2020, which claims priority from Spanish Patent Application No. P201930619 filed Jul. 4, 2019. Each of these patent applications are herein incorporated by reference in their entirety.

OBJECT OF THE INVENTION

The present invention discloses a method and a device for the simultaneous lyophilisation of multiple biological samples housed within coded containers. More specifically, the present invention describes the combined use of a diffuser block with an open bottom and with a perimeter cavity, which has high thermal performance, and a transfer lid intended to transfer the coded containers with the biological samples between different supports to the diffuser block, enabling storage at room temperature, ensuring the traceability of all lyophilised samples at all times.

BACKGROUND OF THE INVENTION

Currently, samples of tissues, cells, different cellular components, body fluids or culture derivatives are usually stored in cryogenic containers that require high energy consumption and at the same time high investment in infrastructure, such as for example:

- mechanical freezing equipment between −20° C. and −150° C. or liquefied gas storage systems (e.g., liquid $N_2$);
- support equipment to avoid/control possible failures (backup equipment, continuous temperature recording, alarms, autonomous electric generators);
- large spaces necessary to house the freezing equipment, which furthermore require: i) sturdy floors to support the weight of the equipment; ii) air conditioning systems to avoid excessive heating of the rooms; iii) ventilation and forced extraction systems to avoid the risks associated with the use of high pressure liquefied gases for backup ($CO_2$ and/or $N_2$).

Therefore, adapting the method of drying the samples by lyophilisation for storage at room temperature reduces costs, while enabling greater stability of the quality thereof since it is not subject to possible oscillations in the cold chain, advantages which can be extended to the transport of samples under extreme environmental temperature conditions.

The process of preservation by lyophilisation is based on dehydrating samples until they reach a water content of less than 1.5% (anhydrobiosis) so that they are left in an inert and stable state that enables them to be stored at room temperature, ensuring the quality thereof for long periods of time. This process is carried out in three consecutive steps:

1) freezing,
2) primary drying or sublimation,
3) secondary drying or desorption.

This technology is known and widely used in many processes for preserving products at room temperature and it is commonly used in the pharmaceutical, cosmetic and dietary industries for preserving medicines, vaccines, vitamins, foods and food supplements. The equipment and techniques used have a high degree of development/complexity and usually use containers to contain the samples to be lyophilised, which have a high surface/volume ratio in order to facilitate the processing of the samples. However, there is no multi-well thermal diffuser block system on the market which allows for the simultaneous lyophilisation of multiple samples contained in individual containers identified with unique codes, which ensures both the traceability of the samples and the exact homogeneous control of the temperature in all the tubes during the process, regardless of the relative position with respect to the rest of the samples, and which can be applied to tubes with relatively low surface/volume ratios.

The only diffuser block prototype known to the applicant is that of the company Virtix ("New products: Well Freeze-Drying System", Science, 2008; 320(5878): 954; and Patel SM & Pikal MJ. "Virtix 96 well freeze-drying system". AAPS PharmSciTech, 2011; 12 (1): 372-378), but this equipment does not enable each of the samples to be individually identified nor does it thus ensure the traceability thereof during the lyophilisation process.

DESCRIPTION OF THE INVENTION

The present invention seeks to solve some of the problems mentioned in the state of the art. More specifically, in a first aspect the present invention describes a device for the simultaneous lyophilisation of multiple samples based on an open-bottom diffuser block with a perimeter groove which has high thermal performance and further comprises a complementary transfer lid for the transfer of the samples to other supports, thus ensuring the traceability of the lyophilised samples at all times.

More particularly, a first aspect of the present invention discloses a device for the simultaneous lyophilisation of a plurality of biological samples housed within coded containers, which comprises a diffuser block made of a metal alloy with high thermal conductivity comprising a plurality of openings which define receptacles to house the coded containers and which further comprises:

- a perimeter cavity configured so that the alloy surrounding each receptacle is similar in all the coded containers, enabling high thermal homogeneity, and
- the receptacles have through openings defining an open bottom.

Each of the receptacles of the diffuser block encompasses each of the coded containers individually and enables energy to be transferred by conduction from the lyophiliser plate to the sample containing receptacle, since in the vacuum situation in which lyophilisation is carried out there is no possibility of transfer by convection.

The perimeter cavity of the diffuser block, around the outer receptacles of the diffuser block, causes the amount of metal alloy surrounding each sample container receptacle (both those located in the central positions of the diffuser block and those located in lateral and perimeter positions) to be similar, which translates into great thermal homogeneity of the assembly with minimal temperature differences between the receptacles, regardless of the relative position of each one in relation to the rest (centred vs. lateral) and of the area and volume of metal alloy existing therebetween.

Likewise, the cavity of the base of the diffuser block in each of the receptacles, in addition to enabling direct contact of the sample container with the lyophiliser hot plate, allows the coding of the sample containers to be simultaneously read by a multi-read system (scanner) of identifier codes (e.g., two-dimensional or one-dimensional codes).

Preferably, the receptacles have a matrix configuration with a plurality of rows and columns. In other words, the design of the diffuser block can have multiple matrix configurations depending on the arrangement and number of receptacles, such as for example: i) 384 (24×16) matrix; ii) 96 (12×8) matrix; iii) 48 (8×6) matrix; iv) 24 (6×4) matrix; v) 12 (4×3) matrix; vi) 6 (3×2) matrix; vii) 4 (2×2) matrix.

Alternatively, the receptacles may have a single row linear configuration. For example, linear combinations of multiple containers, for example 2, 3, 4, 5, 6, 7, etc.

In said embodiment of the diffuser block with in-line receptacles, the diffuser block may further comprise a lateral cavity of the receptacles to enable the coding of the coded sample containers to be read by lateral code readers (scanners).

Preferably, for an in-line configuration of the receptacles that house the coded sample containers, the diffuser block could contain a relief or groove that only enables it to fit in the position where the code of the receptacle is visible from the lateral cavity of the same.

The diffuser block can be made of 7075 aluminium-zinc metal alloy (Zicral), although it could also be made of other metal alloys that, by maintaining the high thermal conductivity of the metal alloy, gives it lightness and greater tensile strength and mechanical fatigue strength, such as for example alloys with different percentages of aluminium, silver, gold, manganese, magnesium, titanium, silicon, iron, chromium and/or copper.

The diffuser block receptacles in any of the configurations (matrix or linear) are configured to adapt to the different types of coded containers based on:

composition, for example, plastic, metal or glass polymers.

shape, for example, cylindrical tubes, polygonal tubes or tubes with protruding tabs for the immobilisation thereof in the corresponding receptacle; each of which can have a flat, concave or differently inclined base or a V-shaped base on all or only some of the slopes.

volume from nanolitres to decilitres.

The containers can be hermetically sealed with caps made of a thermoplastic elastomer (TPE) polymer compatible with the lyophilisation process (such as rubber, silicone and/or plastic; or copolymers thereof), arranged on a disposable mesh that enables all the containers to be simultaneously sealed according to the different geometries of the container and the receptacles.

The diffuser block with the aforementioned features has high thermal conductivity to enable energy to be transferred to the sample containers during the vacuum sublimation phase of the lyophilisation process.

The tests carried out in the lyophilisation equipment showed heat transfer of up to 30% higher than that produced when the same process was carried out on the starting base plate of the sample containers (made of plastic polymer).

In addition, it shows great temperature homogeneity in all the tubes, regardless of the position thereof in the starting plate (centred vs. lateral position), thanks to the perimeter groove and the open bottom.

Likewise, the lateral cavity and the open bottom enable the identification codes of each of the sample containers to be read without the need to remove them from the diffuser block, facilitating the identification thereof and ensuring the traceability of the same at all times.

It enables the sample containers to be oriented by means of their unique and unequivocal positioning within the diffuser block in relation to the system for reading the identification codes of the sample containers (scanner).

The device may further comprise a transfer lid that enables the direct and orderly transfer of the sample containers from the original support thereof (e.g., box) to the diffuser block and the subsequent return thereof to that support for their final storage without the possibility of a positioning error or loss of traceability. It enables the relative position of each individual container to be maintained at all times in a simple way with respect to the initial position, eliminating possible location errors (traceability) in the transfer thereof.

For said functionality, the transfer lid comprises a base wherein a plurality of columns forming an extension from the base protrude and the combination of every four columns defines a central housing intended to house the coded containers.

Likewise, the transfer lid comprises at least one tab on each side that exceeds the columns in height. Preferably, it comprises a tab on the narrower side and two tabs on the longer side. Additionally, the diffuser block comprises positioning grooves adapted to house the tabs of the transfer lid.

The tabs of the transfer lid are also configured to fit into the container starting base (e.g., commercial box) of the coded containers, facilitating the transfer of said starting base to the transfer lid, and later from the transfer lid to the diffuser block, without losing the traceability of the samples.

The combination of the transfer lid with the diffuser block ensures the traceability of the samples at all times. By enabling the coded containers containing the samples to move between the container starting base (e.g., commercial box) and the diffuser block, possible errors in identifying the samples (loss of traceability) are thus eliminated.

The transfer lid can have an intuitive and unique orientation to avoid confusion during the transfer process of the samples housed in the coded containers. Furthermore, as mentioned, it can be adapted to the diffuser block and to the starting box wherein the sample containers are housed.

The use of this lid can be manual, using the geometry thereof to carry out the transport and transfer between supports, or it can be carried out by using a robotic arm. Preferably, the lyophilisation installation comprises the device described above with any of the possible variants thereof, as well as further comprising a starting box wherein the coded containers, a lyophilisation device configured for freezing and vacuum drying the samples, a lyophiliser tray, a scanner, and vacuum sealing device are initially housed.

In a second aspect of the invention, a method of using the lyophilisation installation is disclosed, wherein the method comprises:

placing the transfer lid on top of the starting box comprising the coded containers forming an assembly which comprises the starting box and the transfer lid, flipping the assembly 180° so that the tubes are placed between the columns of the transfer lid and removing the starting box, placing the diffuser block so that the flanges of the transfer lid fit into the grooves of the diffuser block forming a second transfer lid and diffuser block assembly, flipping the second assembly 180° so that the coded containers are placed in the diffuser block, placing the oriented diffuser block in the scanner, proceeding to read the codes of the coded containers and storing the generated information in a database, dispensing the biological sample and a lyophilisation matrix solution into each coded container, placing the diffuser block in the lyophiliser tray and starting lyophilisation in the lyophiliser device, The lyophilised biological samples in the coded containers can be transferred back to the starting box by following the steps in reverse order so that they maintain the exact same order and do not lose traceability.

Subsequently, said starting box which comprises the coded containers with the lyophilised biological samples is preferably vacuum sealed with the vacuum sealing equipment of the installation.

The method described above, as well as any of the steps thereof, and the dispensing of the biological samples and the lyophilisation matrix solution can be performed by a robotic arm.

The biological samples that can be used for this process, inter alia, comprise: tissues, cells, blood, plasma, serum, cerebrospinal fluid, synovial fluid, amniotic fluid, vitreous humour, aqueous humour, tears, saliva, urine, faeces, sweat, semen, cells, exosomes, subcellular organelles, nucleic acids (for example, DNA and RNA), drugs, vaccines, toxins, vitamins, enzymes, cofactors, lipids, hormones, peptides, fluorochromes, cofactors, proteins, antibodies, antigens or cytokines.

Preferably, the lyophilisation matrix is an aqueous solution comprising sugars, surfactants, antioxidants, salts, or combinations thereof.

The sugars can be selected from a list comprising: mannitol, sucrose, trehalose, glucose and combinations thereof; the surfactants are selected from the list comprising: Polysorbate 20, Polysorbate 80, or combinations thereof; the antioxidants comprise epigallocatechin gallate, and the salts are selected from the list comprising: TrisClH, sodium acetate, sodium phosphate, or combinations thereof.

EXAMPLES

The following application examples are used to illustrate the method, but do not limit the scope of the patent. Example of an application model for lyophilisation of DNA samples:

Diffuser block made of polyhedral 7075 aluminium-zinc metal alloy (127 mm long×85 mm wide×15 mm high), with two 12 mm recesses at 45° in the two corners of a long side (the short sides being 77 mm wide) and 96 cylindrical receptacles (8 mm diameter×14 mm high, plus 1 mm end where the diameter thereof is reduced to 6 mm) which extend beyond the total height (15 mm) of the block. The receptacles are arranged in a matrix format with 12 columns×8 rows, equidistant 1 mm at the top and 3.18 mm at the base. The block has, at the base thereof, an 8 mm deep×4 mm wide perimeter groove, separated 1.5 mm from the outside on the long side and 4 mm on the short side, which surrounds the entire block, except for a 1.5 mm septum in the middle of the left short side. In the upper part, the block has a 6 mm wide×35 mm long through groove (15 mm deep), located in the middle of the right short side. In the middle of the two long sides, there are two other 2.2 mm wide×14 mm long through grooves. Along the entire edge of the upper part, the block has a 2 mm wide and 3 mm deep recess that enables the transfer lid designed for this purpose to be fitted.

96 0.75 ml polypropylene tubes with a V-bottom and precoded at the base thereof with 2D codes, arranged in the starting box thereof (0.75 ml Loborack-96 V-bottom; Micronic).

Transfer lid made of ABS plastic polymer with 2 mm wide polyhedral walls (127 mm long×85 mm wide×34 mm high). It has 117 19 mm high×3 mm diameter cylindrical columns, arranged in a matrix of 13 columns×9 rows, which leave 96 9 mm diameter positions arranged in a matrix of 12 columns×8 rows therebetween. On the right short side, it has a 24 mm long×2.5 mm wide×10 mm deep tab that protrudes 2 mm over the lateral edge. In the middle of the two long sides, there are two other smaller 1.8 mm wide×13 mm long tabs that protrude 9 mm over the lateral edges of the lid.

Lyophilisation matrix made up of 0.21M Trehalose, dissolved in 10 mM Tris-HCl 1 mM EDTA saline buffer, pH 8.0 (TE 1× buffer). Boxes of 2D pre-coded polypropylene tubes, 0.75 ml Loborack-96 V-bottom (Micronic). TPE Lyo Caps-96 lyophilisation caps (Micronic).

Epsilon 2-4 LSC-plus lyophiliser device (Martin Christ, Germany) and liquid handling robot, with integrated barcode scanner, (mod. Tecan EVO150; Tecan, Switzerland). 2D tube scanner (Micronic, Lelystad, the Netherlands). Vacuum bag sealing device 1.—Preparation of the DNA Samples to be Lyophilised.

The DNA samples must be at room temperature (20-25° C.), or refrigerated at 4° C., prior to the start of the process.

2.—Transfer of the 2D Tubes from the Original Box to the Diffuser Block.

The transfer lid is put on top of the starting tube box.

It is flipped 180° so that the tubes are face down on the lid and the original box of the tubes is removed.

The diffuser block is fitted face down on the tubes.

The entire assembly is flipped 180° again and the transfer lid is removed, so that the 2D tubes are placed on the diffuser block.

3.—Reading the Codes of the 2D Tubes in the Thermal Block

The oriented diffuser block is placed in the scanner (only one position is possible) and the codes of the 2D tubes then are read with the scanner and the information generated about the identification of each of the 2D codes is stored in a data file.

4.—Preparation of the DNA Sample to Lyophilise

By means of the robotic arm of the device, the following will be dispensed into each of the tubes contained in the 96 receptacles of the diffuser block:

200 µl of DNA at a concentration of 100 ng/µl in TE 1×.

100 µl of the 0.21M trehalose matrix in TE 1×.

5.—Lyophilisation Process of the DNA Samples i. The sheet with the 96 lyophilisation caps (TPE Lyo Caps-96) is positioned on the 96 tubes with the DNA and matrix mixture, without pressing to prevent them from closing.

ii. The diffuser block with the tubes and the lyophilisation caps are moved to the lyophiliser tray.

iii. In the lyophilisation equipment, the following sequence of temperatures, pressures and lyophilisation times are programmed:

Freezing at atmospheric pressure:

Freezing ramp 1° C./min from room temperature to −30° C.

Stationary phase: 3 h at −30° C.

Primary drying at 0.380 mbar pressure:

Ramp from −30° C. to −20° C.; 1° C./min.

Stationary phase: 10 h at −20° C.

Ramp from −20° C. to −10° C.; 1° C./min.

Stationary phase: 2 h at −10° C.

Final drying at 0.001 mbar pressure:

Ramp from −10° C. to 20° C.; 0.4° C./min.

Stationary phase: 4 h at 20° C.

iv. Once the entire lyophilisation process has finished, while the device is still under vacuum, the tubes containing the samples are closed by the pressing of the lyophiliser device.

6.—Repositioning of the Tubes in the Starting Package.

The 2D tubes are transferred from the thermal diffuser block to the starting box using the tube transfer lid to do so, following the reverse order of the steps indicated in section 2 of the example.

7.—Final Storage of the Lyophilised Products.

1. By means of the vacuum sealing equipment, the final packaging of each of the tube boxes is carried out.

2. Each box is filed in the room temperature warehouse designated for that purpose.

DESCRIPTION OF THE DRAWINGS

As a complement to the description provided and for the purpose of helping to make the features of the invention more readily understandable, in accordance with a practical preferred exemplary embodiment thereof, said description is accompanied by a set of drawings which, by way of illustration and not limitation, represent the following.

PREFERRED EMBODIMENT OF THE INVENTION

Figure 1A:
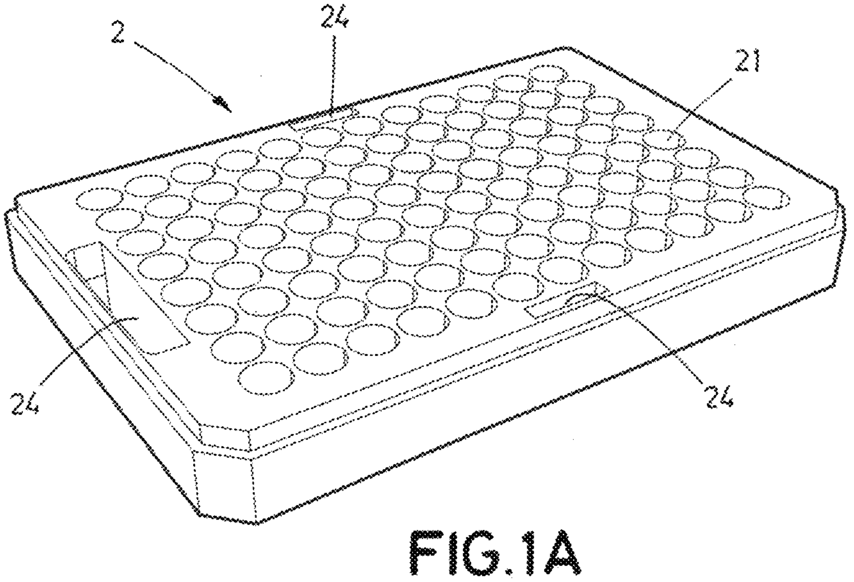
FIG. 1 shows three perspective views of a preferred embodiment of the diffuser block, wherein the perimeter cavity, the open bottom and the coded containers housed in the receptacles of the diffuser block are shown.
Figure 1B:
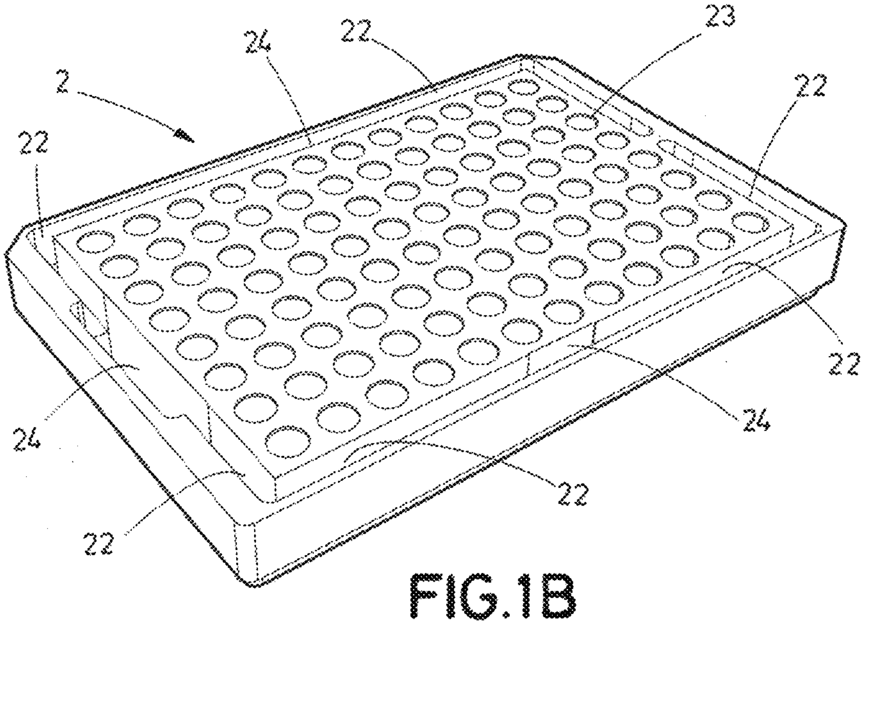
Figure 1C:
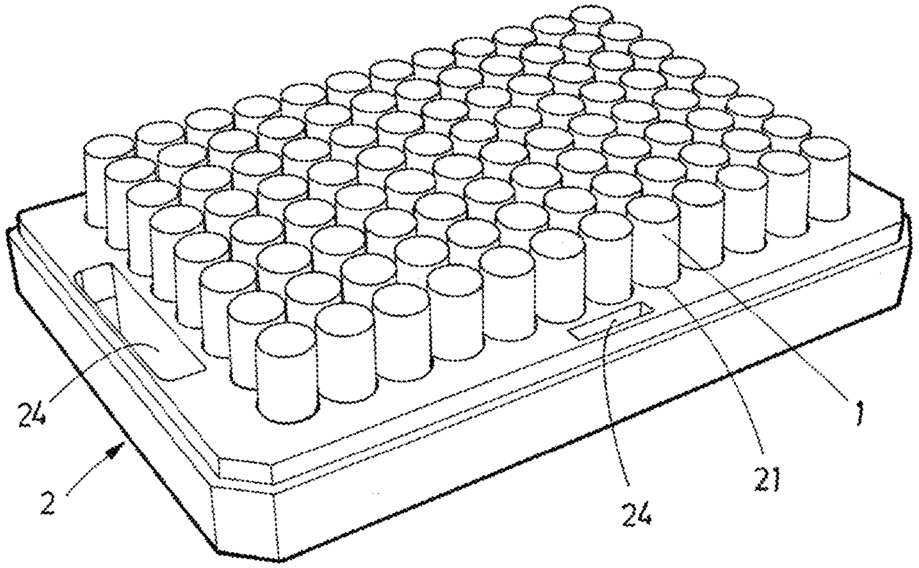

FIG. 1 clearly shows a preferred embodiment of a first aspect of the invention, wherein a diffuser block (2) is shown as a device for the simultaneous lyophilisation of a plurality of biological samples intended to be housed within coded containers (1).

FIG. 1 also shows that the diffuser block (2) has a plurality of openings which define receptacles (21) to house the coded containers (1) therein. Said diffuser block (2) in the described preferred embodiment is made of a metal alloy with high thermal conductivity and has a perimeter cavity (22) configured so that the alloy surrounding each receptacle (21) is similar in all the coded containers (1), enabling high thermal homogeneity. It also shows that the diffuser block (2) comprises an open bottom (23) since the receptacles (21) have through openings. In addition, it also shows that the diffuser block (2) comprises three transfer grooves (24), one on the narrower side of the diffuser block (2) and the other two remaining grooves on the longer side of the diffuser block (2).

The diffuser block (2) with the aforementioned features has high thermal conductivity to enable energy to be transferred to the sample containers during the vacuum sublimation phase of the lyophilisation process.

In addition, it shows great temperature homogeneity in all the coded containers (1), regardless of the position thereof in the starting plate (centred vs. lateral position), thanks to the perimeter groove and the open bottom.

Likewise, the open bottom enables the identification codes of each of the sample containers to be read without the need to remove them from the diffuser block, facilitating the identification thereof and ensuring the traceability of the same at all times.

Figure 2A:
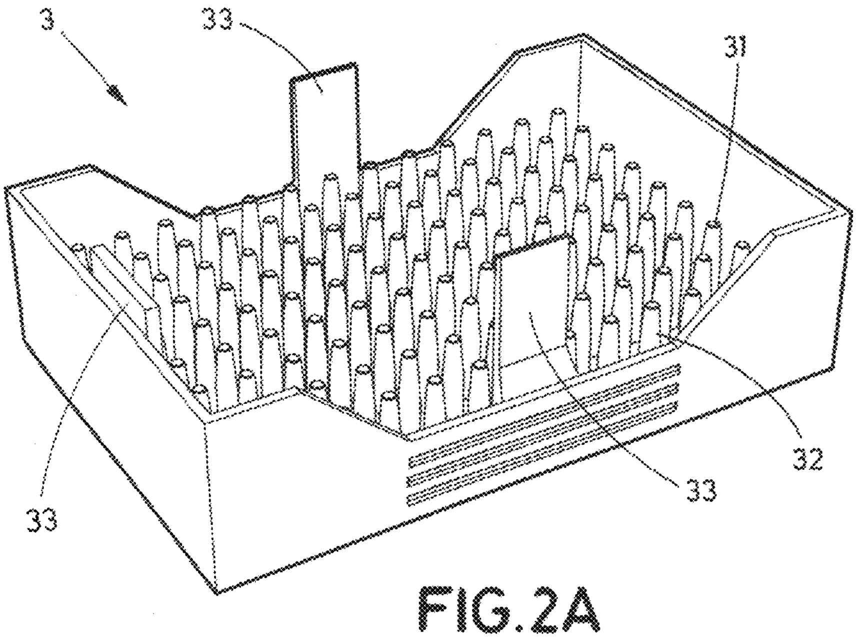
FIG. 2 shows three perspective views of the preferred embodiment of the transfer lid, wherein the columns of the transfer lid, as well as the tabs that enable the transfer lid and the diffuser block to be joined in a given unique position are shown.
Figure 2B:
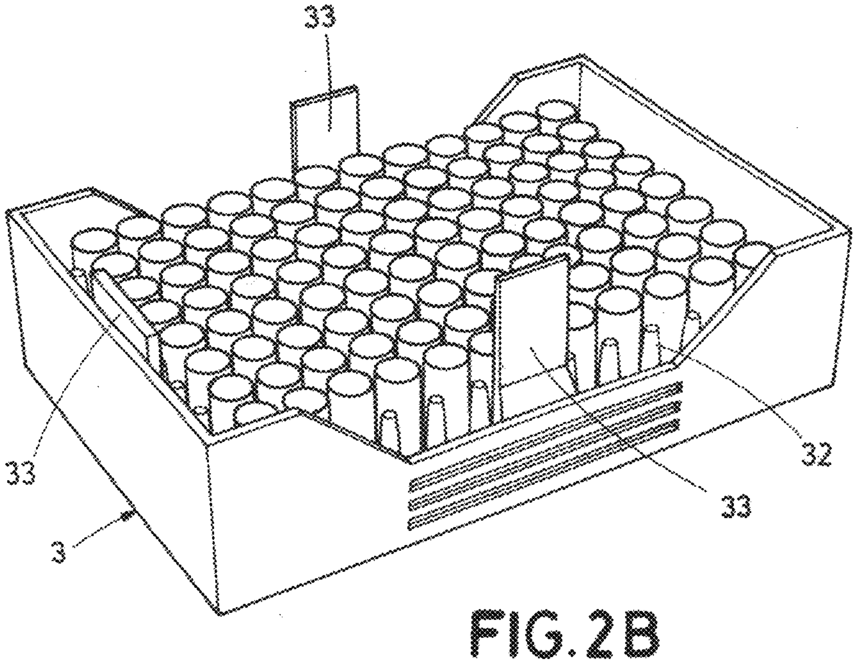
Figure 2C:
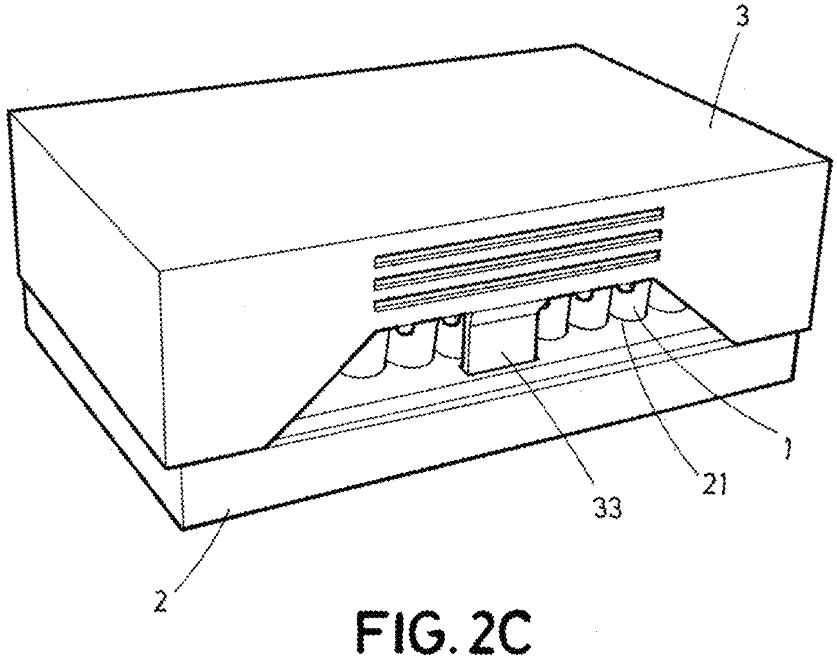

FIG. 2 shows the described preferred embodiment wherein the device further comprises a transfer lid (3) which comprises a base (31) wherein a plurality of columns (32) configured in arrangement and quantity to the plurality of receptacles (21) of the diffuser block (2) and adapted to house the coded containers (1) protrude.

FIG. 2 also shows a tab (33) that exceeds the columns (32) in the transfer lid (3) in height. Said tabs (33) are adapted to be housed in the grooves (24) of the diffuser block to enable the transfer lid (3) and diffuser block (2) to be joined in a given unique position. In the preferred embodiment, the transfer lid (3) is made of plastic.

Figure 3:
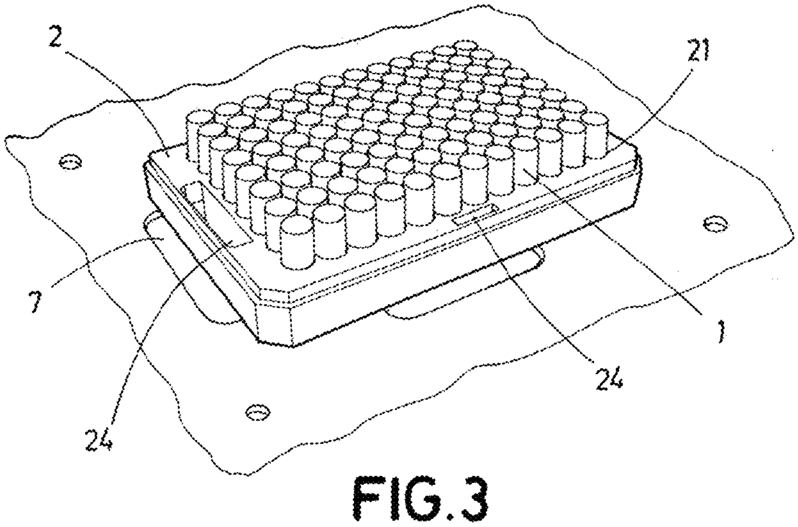
FIG. 3 shows a perspective view of the diffuser block with the coded containers housed in the receptacles and their positioning in the scanner.
Figure 4:
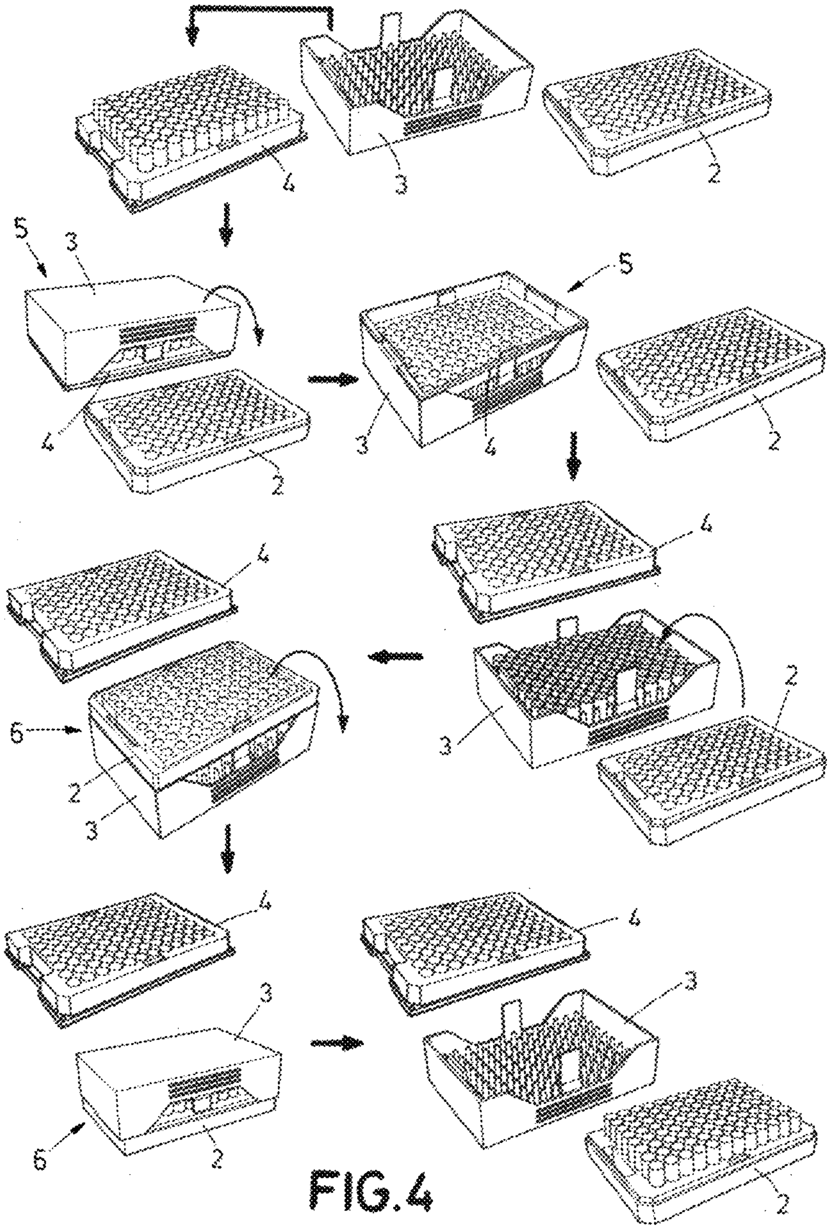
FIG. 4 shows a perspective view of a preferred embodiment, wherein some of the steps of the method to maintain the traceability of the samples are shown.
Figure 5A:
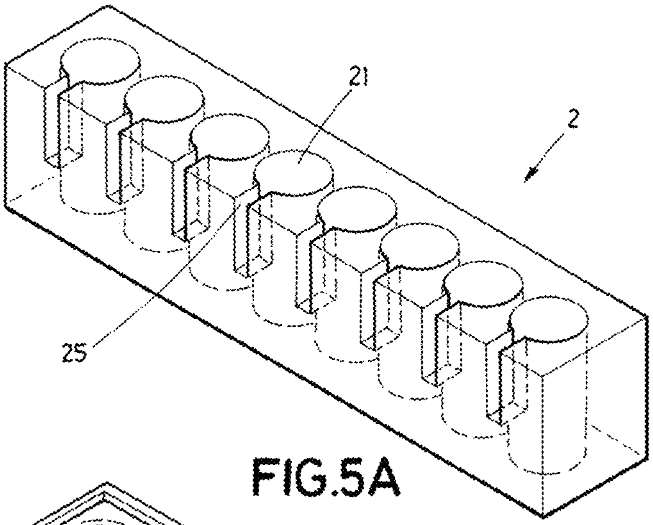
FIG. 5*a* shows a perspective view of a second alternative embodiment of the diffuser block, with a single row linear configuration wherein a view from the upper face is shown and the lateral cavity is represented.
Figure 5B:
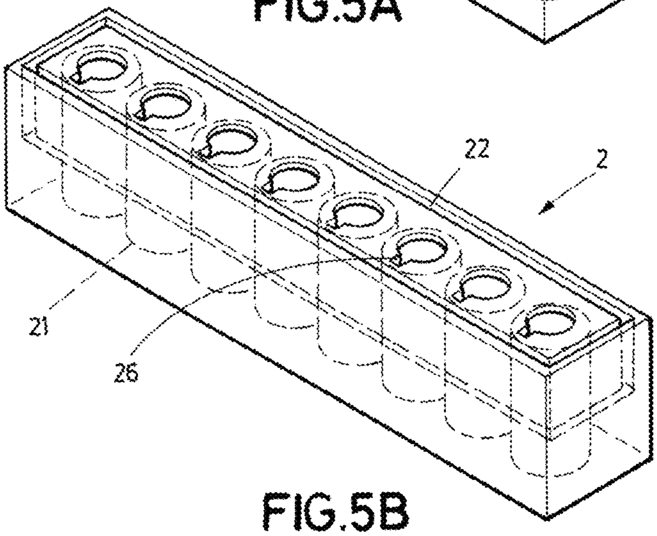
FIG. 5*b* shows a perspective view of the second alternative embodiment, wherein the lower face is shown and the perimeter cavity, the open bottom and the relief of the receptacles are represented.

FIG. 3 shows a perspective view of the diffuser block (2) with the coded containers (1) in the receptacles (21), being scanned in a scanner (7), of a lyophilisation installation comprising a starting box (4) shown in FIG. 4, wherein the coded containers (1), a lyophilisation device (not shown) configured for freezing and vacuum drying the samples, a lyophiliser tray (not shown), a scanner (7), and vacuum sealing equipment (not shown) are initially housed.

FIG. 4 shows a perspective view of a second aspect of the present invention, wherein a method of using the device to ensure the traceability of the samples in a lyophilisation installation which improves the thermal homogeneity of the samples is shown.

The starting box (4) is initially shown with the coded containers (1), the transfer lid (3), and the diffuser block (2). In a first step of the described preferred embodiment, FIG. 4 shows that the transfer lid (3) must be placed on top of the starting box (4) which comprises the coded containers (1) forming an assembly (5) comprising the starting box (4) and the transfer lid (3).

Subsequently, the assembly (5) must be rotated 180° so that the coded containers (1) enter the columns (32) of the transfer lid (3) and the starting box (4) must be removed.

Next, it shows that the diffuser block (2) must be placed so that the tabs (33) of the transfer lid (3) fit into the grooves (24) of the diffuser block (2), forming a second assembly (6) of transfer lid (3) and diffuser block (2).

The next step is to flip the second assembly (6) 180° so that the coded containers are placed in the diffuser block (2). Next, the oriented diffuser block (2) is placed in the scanner (7), and the codes of the coded containers (1) are then read, enabling the generated information to be stored in a database.

In a preferred embodiment, the biological sample and a lyophilisation matrix solution are dispensed into each coded container (1) by a robotic arm.

Thus, the traceability of the samples has been ensured, and it is likewise ensured if the same process is performed in reverse order after lyophilisation. Consequently, the diffuser block (2) is placed in the lyophiliser tray and lyophilisation is started in the lyophiliser device. Once the samples have been lyophilised, the reverse order is followed to move the samples to the starting box (4) maintaining traceability at all times, therefore using the transfer lid (3) again.

Finally, the already lyophilised samples in the coded containers (1) in the starting box (4) are vacuum sealed in the starting box (4).

The invention claimed is:

1. A lyophilisation device for a simultaneous lyophilisation of a plurality of biological samples intended to be housed within coded containers, which comprises a diffuser block made of a metal alloy with high thermal conductivity comprising a plurality of receptacles to house the coded containers, wherein said diffuser block further comprises:

a perimeter cavity enabling high thermal homogeneity, and the receptacles have through-holes defining an open bottom, and characterized in that the device further comprises a transfer lid which comprises a base wherein a plurality of columns protrude which are configured to define a central housing around said columns, coinciding with the plurality of receptacles of the diffuser block to house the coded containers, wherein said transfer lid comprises at least one tab that exceeds the columns in height and the diffuser block comprises at least one transfer groove adapted to house flanges of the transfer lid to enable the transfer lid and diffuser block to be joined in a given unique position.

2. The lyophilisation device according to claim 1, wherein the receptacles have a matrix configuration with a plurality of rows and columns.

3. The lyophilisation device according to claim 1, wherein the receptacles have a single row linear configuration.

4. The lyophilisation device according to claim 3, wherein the diffuser block comprises a lateral cavity intended to enable the coded containers to be read by a scanner.

5. The lyophilisation device according to claim 4, wherein the receptacles have a relief configured to enable the coded containers to fit in one position that enables scanning from the lateral cavity of the diffuser block.

6. The lyophilisation device according to claim 4, wherein the transfer lid is made of plastic.

7. The lyophilisation device according to claim 4, wherein the transfer lid is made of a metal alloy.

8. The lyophilisation device according to claim 1, wherein the diffuser block is a 7075 aluminium-zinc metal alloy.

9. An installation comprising the device of claim 1, further comprising a starting box wherein the coded containers, a lyophilisation device configured for freezing and vacuum drying the samples, a lyophiliser tray, a scanner, and vacuum sealing equipment are initially housed.

10. A method of using the installation of claim 9 for lyophilisation and traceability of biological samples, further comprising the following steps:

A. placing the transfer lid on top of the starting box comprising the coded containers forming a first assembly which comprises the starting box and the transfer lid, B. flipping the first assembly 180° so that the coded containers enter between the columns of the transfer lid and removing the starting box, C. placing the diffuser block so that the flanges of the transfer lid fit into the groove of the diffuser block, forming a second assembly of transfer lid and diffuser block, D. flipping the second assembly 180° so that the coded containers are placed in the diffuser block, E. placing the diffuser block in the scanner, proceeding to read the codes of the coded containers and storing the codes in a database, F. dispensing the biological sample and a lyophilisation matrix solution into each coded container, G. placing the diffuser block in the lyophiliser tray and starting lyophilisation in the lyophilisation device.

11. The method of using the installation according to claim 10, further comprising transferring the coded containers with the biological samples and the lyophilisation matrix solution after lyophilisation to the starting box following a reverse order of the steps of claim 8.

12. The method of using the installation according to claim 10, further comprising vacuum sealing the starting box with the coded containers with the lyophilised samples.

13. The method of using the installation according to claim 12, wherein at least one of the steps A-F is performed by a robotic arm.

14. The method of using the installation according to claim 10, wherein the biological samples comprise at least one product selected from: tissues, cells, blood, plasma, serum, cerebrospinal fluid, synovial fluid, amniotic fluid, vitreous humour, aqueous humour, tears, saliva, urine, faeces, sweat, semen, cells, exosomes, subcellular organelles, nucleic acids (for example, DNA and RNA), drugs, vaccines, toxins, vitamins, enzymes, cofactors, lipids, hormones, peptides, fluorochromes, cofactors, proteins, antibodies, antigens and cytokines.

15. The method of using the installation according to claim 10, wherein the lyophilisation matrix solution is an aqueous solution comprising sugars, surfactants, antioxidants, salts, or combinations thereof.

16. The method of using the installation according to claim 15, wherein the sugars are selected from a list comprising mannitol, sucrose, trehalose, glucose and combinations thereof; the surfactants are selected from a list comprising: Polysorbate 20, Polysorbate 80, or combinations thereof; the antioxidants comprise epigallocatechin gallate, and the salts are selected from a list comprising: TrisCIH, sodium acetate, sodium phosphate, or combinations thereof.

* * * * *